Aug. 6, 1946.  M. W. GAISER  2,405,419
ADJUSTMENT SYSTEM
Filed May 5, 1942  3 Sheets-Sheet 2

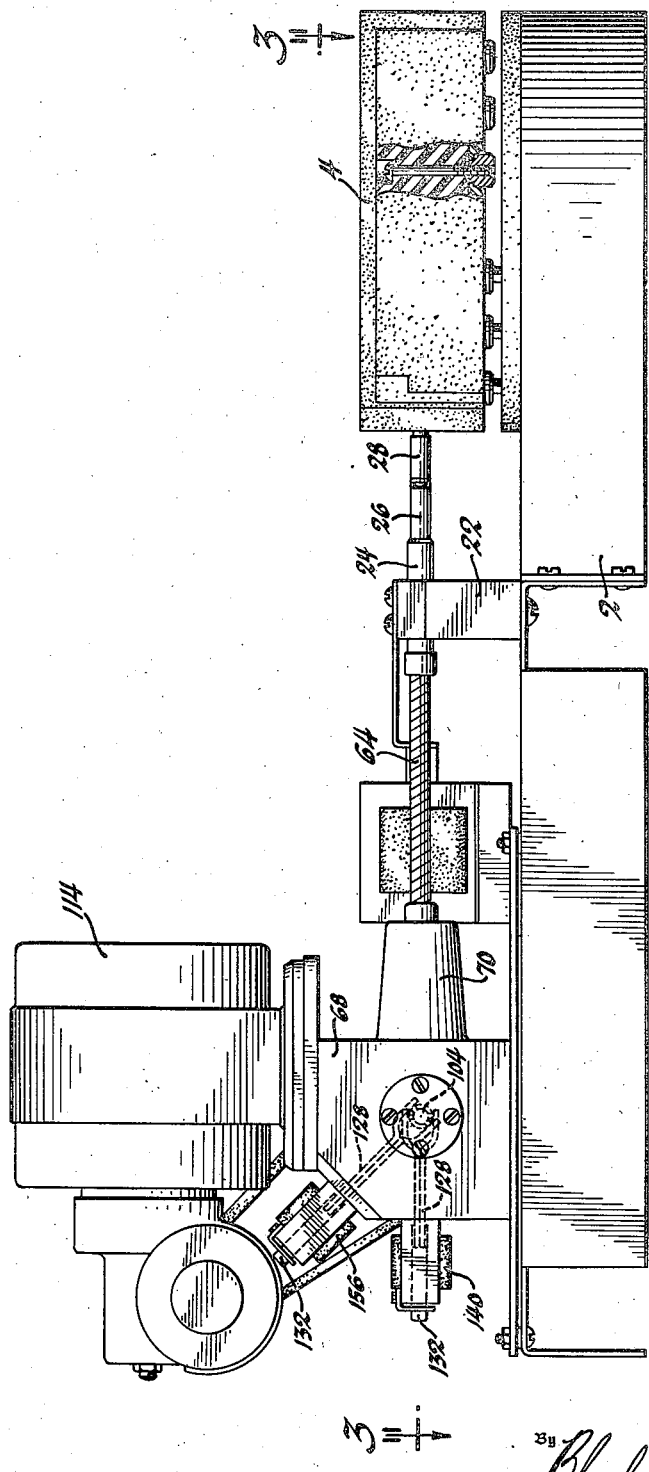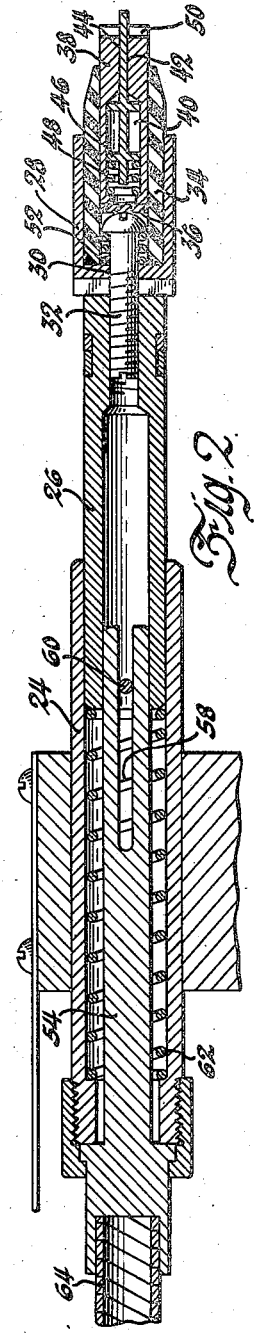

Inventor
Martin W. Gaiser
By
Blackmor, Spencer & Hirt
Attorneys

Aug. 6, 1946.   M. W. GAISER   2,405,419
ADJUSTMENT SYSTEM
Filed May 5, 1942   3 Sheets-Sheet 3

Inventor
Martin W. Gaiser
By Blackmor, Spencer & Hrd
Attorneys

Patented Aug. 6, 1946

2,405,419

UNITED STATES PATENT OFFICE 2,405,419

ADJUSTMENT SYSTEM

Martin W. Gaiser, Kokomo, Ind., assignor to General Motors Corporation, Detroit, Mich., a corporation of Delaware Application May 5, 1942, Serial No. 441,825

13 Claims. (Cl. 250—40)

This invention relates to means for measuring given electrical values and utilizing said measurements for predetermined adjustments. More specifically it relates to means indicating a reversal in rate of change in voltage or in the directional flow of current in a circuit to enable adjustment at a given optimum value. There are a number of instances where it has been found desirable to ascertain the exact point at which voltage flowing in a circuit ceases to increase and begins to decrease as the values or quantities of the various elements composing the circuit are varied. This may be termed finding the "peak" or resonance point of a circuit. There are many instances in which such means might be advantageously employed and as one example there is shown in the following specification the use of such a peak relay or indicator used in adjusting an intermediate frequency transformer assembly to a set predetermined frequency automatically which is then assembled into a radio receiver. It is to be understood that this is merely for illustrative purposes and should not be considered as limiting the broader aspects of my invention.

These intermediate transformer assemblies mentioned above are factory-adjusted or tuned to a given frequency which is fixed. This frequency is usually below the frequency normally employed in a broadcast band, and as one example, may be 252 kilocycles. They are formed of two coils inductively coupled and each coil has a condenser connected thereacross to form a resonant circuit therewith. This therefore provides two capacity-inductance circuits magnetically coupled together and these are intended to be tuned to the same resonant frequency to pass a maximum amount of power from the output of the first detector or mixer tube to the second detector in a conventional receiver. Physically these coils are wound on a common form and mounted on a base with two trimmer condensers which are small spaced plates separated by a dielectric, one plate being adjustable with respect to the other by movement of a small screw. These trimmer condensers are so mounted on the base that these adjustable screws are accessible for adjustment, the whole assembly forming a unitary part for insertion into the receiver chassis after the two circuits have been accurately tuned to the intermediate frequency of the set for which it was designed.

It is therefore an object of my invention to provide means for ascertaining or determining the resonant condition of an electrical circuit.

It is a further object of my invention to provide means for automatically peaking or adjusting a circuit to its resonant condition.

It is a still further object of my invention to provide means for automatically adjusting an intermediate frequency transformer to a predetermined resonant frequency before insertion into a radio receiver.

It is a still further object of my invention to provide such automatic means for adjusting a resonant circuit which will be simple in operation and will not easily get out of adjustment.

With these and other objects in view, which will become apparent as the specification proceeds, my invention will be best understood by reference to the following specification and claims, and the illustrations in the accompanying drawings, in which:

Figure 1 is a side elevation showing the adjusting means of my invention;

Figure 2 is an enlarged detailed sectional view taken on line 2—2 of Figure 3 through the screw driving means for adjustment;

Referring now more specifically to the drawings, in Figure 1 there is provided a suitable base 2 which supports thereon a test block 4 which is adapted to support devices to be adjusted such as intermediate frequency transformers mentioned above. These transformers are usually obtained in the shape of a small rectangular metallic container of substantially square cross section having somewhat the appearance of a small tube. Extending from one end of this container there are usually a series of connecting wires, such as shown in dotted lines in Figure 3 at 6, 8, 10 and 12, which extend from the coils and condensers within the metallic container and are clipped under suitable connecting clips 14, 16, 18 and 20, the metallic container itself lying between suitable projections on the upper surface of the testing block 4.

Figures 3, 4:
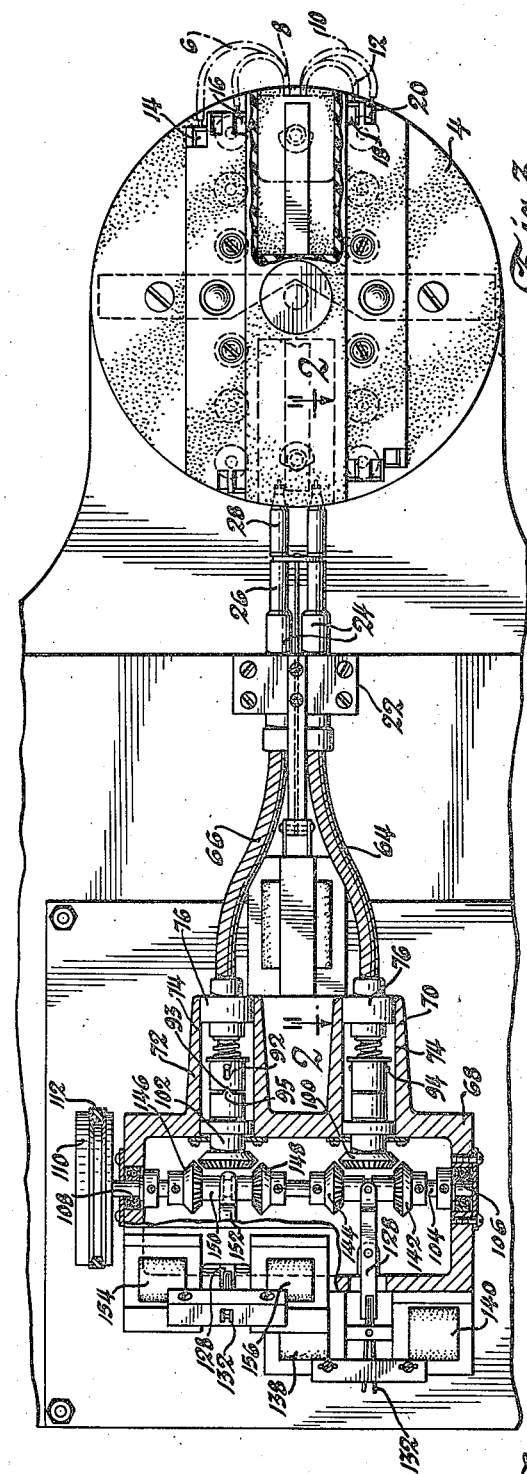
Figure 3 is a top plan view partly in section taken on line 3—3 of Figure 1.
Figure 4 is an enlarged sectional view through the gear driving means.

As will be seen in Figure 3, this test block 4 may be pivoted around its center and in this manner one transformer assembly may be in the process of being adjusted while another is being placed in the opposite end to be ready for adjustment when the first has been completed. After the new transformer has been inserted in its test position, the test block is rotated about its pivot and the transformer then assumes a position as shown in dotted lines in Figure 3 in front of the two motor-driven screw drivers whose purpose it is to engage the adjusting screws and to bring them to the proper position of resonance at a predetermined frequency.

Each of the adjusting screws in the transformer is adapted to be engaged by a separate and independently driven screw driver which is adapted to fit into the slotted end of the screw. The projecting portions of each of these screw drivers are supported in a suitable bracket 22 which carries a plurality of horizontal sleeves 24 in spaced relation, said sleeves telescopically carrying therein a second hollow sleeve 26 which carries on its forward end a hollow metallic cup-shaped member 28. This cup-shaped member has an opening 30 through its base through which projects a stud 32 threaded into the end of the member 26 for supporting the cup member 28 on said end.

Within the cup 28 is a sleeve 34 of resilient insulating material within which is carried the screw driver 38 per se, which it will be seen is fully insulated from its supporting screw by the insulating sleeve 34 and a small insulating pad 36 between the base of the screw driver 38 and the head of the stud 32. The screw driver 38 is maintained within the end of the insulating end 34 with sufficient rigidity so that it cannot turn with respect thereto, but rotates with the cup member 28 whenever the same is driven by suitable means to be described. The inner end of the screw driving member 38 is hollow, as shown at 40, and also has a small bore 42 extending out to its front portion. Within this bore and carried back into the hollow section 40 is a protruding pin member 44 which has a disc-like portion 46, the latter acting as one end stop for and compressing a resilient spring member 48 between itself and the base of the opening 40. This tends to expel the pin 44 from the forward face of the screw driving member 38 which is brought to a driving tip 50. It therefore serves the function of a locating pin, and when the tip 50 proceeds into the groove in a screw head, will of course be pushed back so that it will be flush with the tip of the screw driver. The function of the projecting pin 44 or locating pin is that when the screw driving assembly is moved up to contact the adjusting screw on the base of the transformer, it will tend to locate or find this groove, and when it does fall into the same, will bring in or guide the screw driving tip 50 into the proper groove.

The member 28 is secured, as before stated, by the stud 32 to the forward end of the member 26, but this construction is resilient to the extent that there is provided a coiled spring 52 located between the head of the stud 32 and the base of the member 28 which tends to maintain the cup 28 forced against the end of the member 26 under normal conditions, but allowing it a certain amount of eccentricity.

The hollow portion of the member 26 carries therein a cylindrical member 54 which is directly connected to the end of a flexible drive member 64 which is driven from a prime source of power. This member 54 has a slot 58 therein in which rides a pin 60 carried by the member 26 from one side to the other. This pin and slot connection enables considerable longitudinal movement between the two members 54 and 26, but assures that rotary or driving connection between the two is provided at any of the longitudinally adjusted positions. There is also provided in this instance a helical spring 62 which presses against a shoulder on the inner surface of the supporting member 24 and against the inner end of the member 26 to normally keep the latter spring biased outwardly or toward the end of the transformer. Both of the screw driving assemblies are identical.

The driving means for the flexible driving member 64 and the like member 66 is provided by a gear box 68 which has two forwardly extending portions 70 and 72 which contain cylindrical openings 74 and have in the outer end thereof, a cylindrical bearing plug 76. The end of the driving cable terminates in a connecting tongue 78 adapted to fit within a slot 80 in the end of a drive shaft 82. A long sleeved member 84 is mounted upon the shaft 82 at its opposite end and extends for substantially one-half of the total length of the shaft. This sleeved member carries a suitable ball bearing support 86 which is mounted within the opposite end of the cylindrical opening 74. This sleeve member 84 may rotate with respect to the shaft 82, the shaft 82 projecting from the end of the sleeve and having therethrough a C-washer 85 to prevent the expulsion of various parts carried by said shaft.

Intermediate the two ends of the shaft there is secured thereto a collar 88 adjacent the cylindrical bearing plug 76, and also a movable clutch collar 90 which has diametrically opposed slots 92 therein which are adapted to provide an opening for a pin 94 which extends through the shaft, thus providing means whereby the clutch member 90 may slide longitudinally of the shaft, but always turn with the same. The face of the clutch collar 90 is provided with diametrically opposed grooves 92 therein which are adapted to be engaged by extending tips 95 carried by the adjacent face of the sleeve member 84, thus providing a clutch drive.

Adjacent the inner end of the clutch member 90 is a washer 96 and between this washer and the member 88 and concentric with the shaft is a helical spring 98 which bears against the two members and tends to keep the clutch collar 90 in its left-hand or clutch engaging position as shown in Figure 4. Mounted on the end of the shaft 82 which projects into the main chamber of the gear box is a bevel gear 100 which is rigidly secured to the sleeve member 84. Any driving force thus applied to the bevel gear 100 is transmitted through the sleeve 84, clutch members 93 and 95, pin 94 to the drive shaft 82. The purpose of this clutch arrangement will be described more in detail at a later point. This same construction of course applies to the opposite drive for the second screw driver which is housed within the housing portion 72 which in turn terminates in a bevel drive gear 102 on the inner end of that assembly.

Extending directly across the main portion of the gear box 68 is a main shaft 104 which is trunnioned at one end in a ball bearing assembly 106 and in the opposite end in a second ball bearing assembly 108, the outer projecting end of which has thereon a pulley 110 adapted to be driven by a V belt 112 from some suitable source of power such as the motor 114.

Mounted upon this shaft 104 at one side is a sleeve member 116 which is keyed to the shaft by slots 118 and 120 having therein small balls 122. Thus this sleeve may be slid axially of the shaft, but caused to rotate therewith at all times. At its center this sleeve has an indented groove 124 in which there rides a pin 126 mounted upon one end of a pivoted lever 128 which is pivoted at 130 and carries at its outer end an operating spring 132 which is formed in the general shape of a hairpin, between the two portions of which projects a pin 134 mounted upon a slidable bar 136 whose position is determined by the energization of certain operating coils 138 and 140. Mounted upon this sleeve 116 and on opposite sides of the groove 124 are two bevel gears 142 and 144 which are rigidly secured thereto by suitable set screws. These gears are spaced at such an interval that the bevel gear 100 extends down between them but does not contact either, it being necessary to move either upwardly or downwardly as shown in Figure 4 to form a driving connection between 100 and 142 or 144. Thus it will be seen that in the position shown no driving exists between the shaft 104 and the shaft 82. However, if either of the electromagnets 138 and 140 is energized to cause the sliding member 136 to move, the spring 132 will cause the lever 128 to pivot and to move one or the other of the gears 142 or 144 into engagement, and if the shaft 104 is rotating, such rotation will be transmitted to the shaft 82. The same construction prevails for driving the opposite gear 102 which in this instance may mesh with bevel gears 146 or 148 which are mounted upon a sliding sleeve 150 controlled by the position of a pivoted lever 152 which in turn may be moved by electromagnets 154 and 156.

Thus when the motor 114 is energized, the shaft 104 is rotated, and by controlling the energization of the four electromagnets 154, 156, 138 and 140, either of the screw driving members may be rotated in either direction. From the above description it will be obvious that there is herein provided a pair of motor-driven screw driving means which are capable of rotating in either direction to turn the adjusting screws of the trimmer condensers in a transformer assembly. In order to start at a given index, it has been found desirable to turn the screw varying the condenser to one limit so that the condenser will be at one definite limit of its capacity value, and therefore in actually operating the apparatus the driving means is brought into engagement with the slotted screw head and driven until the screw reaches one limit of travel.

At this point the force being applied by the gear 100 or 102, and which is transmitted to the screw driving head, must find some means of release due to the fact that the screw stops turning. This is provided by the clutch arrangement 93 and 95 which are the projecting and grooved portions of the adjacent associated members 90 and 84. Thus as driving force is applied to gear 100, the sleeve member 84 will continue to rotate, but the grooved and tongue members 93 and 95 will slip over each other and the shaft 82 will not rotate. Thus when the screw driver itself stops, the clutch member will slip and while the main drive shaft 104 continues to rotate, no parts will be broken and this will cause a longitudinal movement of the clutch member 90 lengthwise of the shaft 82. This lengthwise movement will cause the closure of a switch later to be described.

Figure 5:
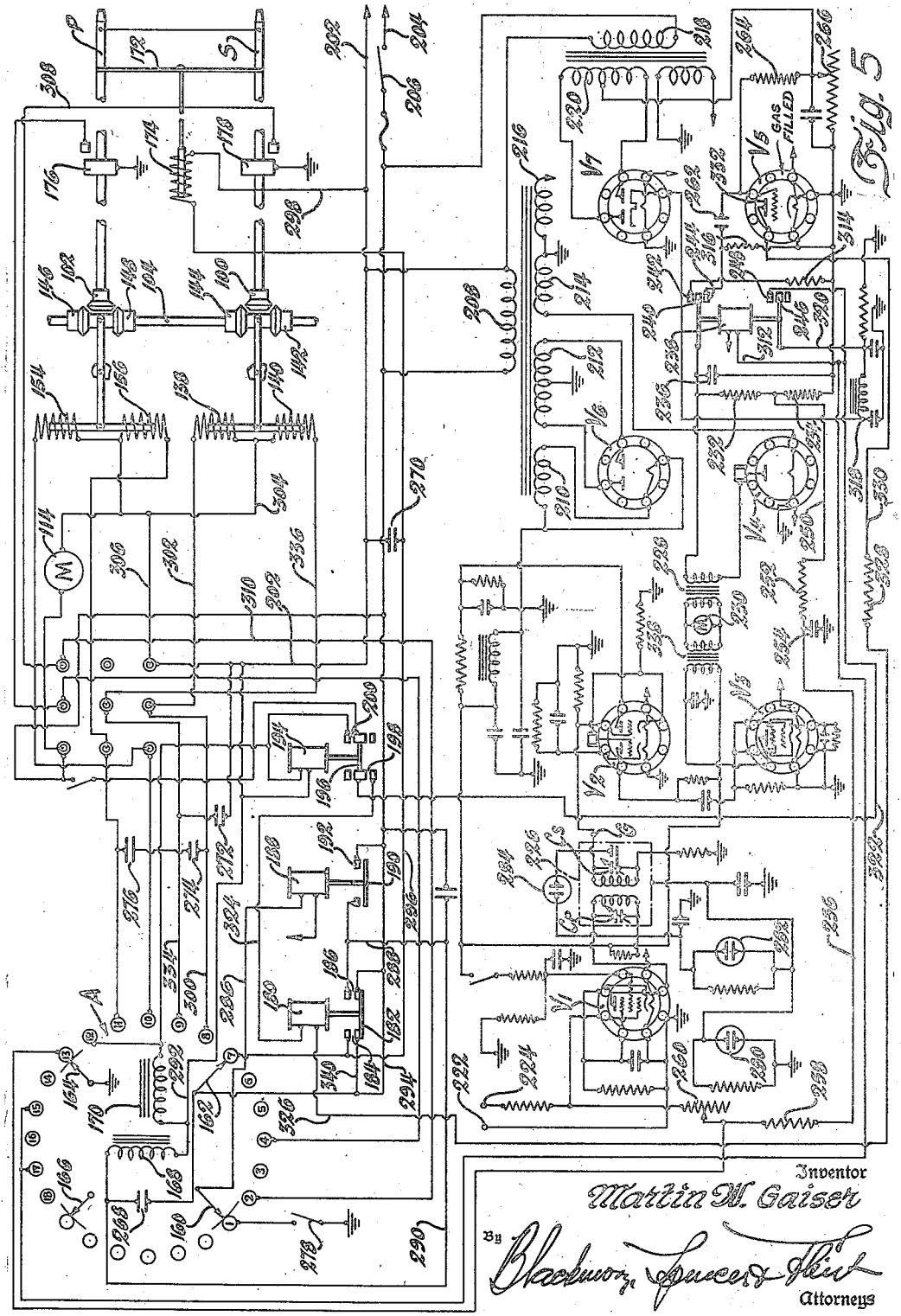
Figure 5 is a schematic wiring diagram of the system of my invention.

Referring now more specifically to Figure 5 which is a circuit diagram of the various connections of my invention, there is therein shown a stepped switching arrangement designated generally at A. This switching means is a ratchet step-by-step switch having a plurality of contact arms which are moved around circumferentially upon a stepping by the control relay. It has a number of different contact points and four switch arms, namely, 160, 162, 164 and 166, each of which rotates one contact position upon an actuation of the ratcheting or driving means. An electromagnet 168 is provided for actually ratcheting the means and driving the rotating switch arms. There is also provided a second electromagnetic means 170 which releases the switch arms when they have completed their movement over a certain number of the switch points and allows them to return by spring pressure to their initial position which is that shown, namely, with switch arm 160 contacting switch point 1, switch arm 162 contacting switch point 7, and switch arm 164 contacting switch point 13. In this particular instance switch arm 166 merely acts as an auxiliary spare and is not utilized.

In the upper right-hand portion of the diagram is more or less schematically shown the screw driving means which has previously been discussed in detail and in this instance the two screw drivers are referred to as S and P, screw driver P being driven by gear 102 which may mesh with drive gears 148 or 146 and screw driver S being driven by gear 100 which may mesh with drive gears 142 or 144, these meshings being controlled by the electromagnets 154, 156, 138 and 140 as previously described. The motor 114 is shown at M. There is also provided means for retracting the two screw driver tips and this is shown diagrammatically as a cross bar 172 which is secured to the movable sections of both S and P and whose position is regulated by an electromagnet 174 whose armature is connected to the cross bar.

There is also provided a switching means, such as diagrammatically shown at 176 and 178, associated with the clutch members 90 of each assembly whereby when the clutch slips at one extremity of travel of the adjusting screw, a circuit will be made to actuate certain necessary apparatus to be described. There are also shown on this diagram a series of operating relays, 180 whose armature 182 operates switches 184 and 186, relay 188 whose armature 190 gaps a switching means 192, a relay 194 whose armature 196 controls one switch 198 in its lower position, and a second switch 200 in its upper or actuated position. The power supply is connected to the two incoming lines 202 and 204 in the latter of which is a main switch 206.

Tapped from the incoming line is a transformer primary 208, the secondary of which is formed of a plurality of coils 210, 212, 214 and 216 which supply different voltages for the amplifying means and the remainder of the system. A second transformer primary 218 also has a plural coil secondary 220 for supplying additional voltages as desired. Any desired source of modulated radio frequency is applied across the terminals 222 and 224 for test purposes. This input is applied to the vacuum tube $V_1$, the output of which is applied to the intermediate frequency transformer being tested which is shown within the dotted line square immediately to the right of $V_1$ and indicated as 226.

The output of the intermediate frequency transformer is connected to a pair of amplifiers $V_2$ and $V_3$ and the output of these two amplifiers is connected to a transformer 228 across the primary of which is connected an indicating meter 230. The output of the transformer 228 is connected to a Thyratron tube $V_5$ which is in this instance the actual detector of the peak or resonant point to be determined and the control voltage in this instance is developed across the resistors 232 and 234 and the capacitor 236. The input circuit to the grid of the tube $V_5$ is controlled by a relay 238 whose armature controls two movable switch points: 240 oscillating between fixed switch points 242 and 244 and 246 cooperating with a switch point 248.

From an intermediate point between the two resistors 232 and 234 there is tapped a line 250 which extends to a resistor 252 and thence to a capacity 254 which acts as a time delay in a given control circuit through line 256 back to control resistors 258 and 260 in the input to tube $V_1$. There is also provided a differentiating circuit which consists of a condenser 262, resistor 264, and a small resistor 266 across the bias grid supply of the tube $V_5$. The tubes $V_6$ and $V_7$ are merely rectifier tubes which are fed by the transformers 208 and 218 and adapted to provide the necessary D. C. voltages at predetermined points in the system.

There are provided at certain predetermined points in the system a plurality of condensers 268, 270, 272, 274 and 276 which are placed in the circuit to limit current or voltage surges which might affect the operation of the Thyratron $V_5$ when various solenoids are operated, but these are not large enough to bypass a sufficient amount of current so that any solenoid will be energized unless direct connection is made to it. If the power supply is closely regulated and certain shielding is employed, these condensers may be omitted. Not all of the lines are shown connected to the various sources of power in order to simplify the drawings. For example, the filament circuits of the various vacuum tubes are not shown connected to a source of power and are merely terminated in an arrow. This is also true of certain of the relay circuits and wherever in the drawings an arrow is applied, it merely means that a suitable source of voltage is connected thereto.

There are also provided a series of small neon tubes 280, 282 and 284 which serve as short circuit indicators. 280 and 282 are normally illuminated and are extinguished when a short circuit occurs, while 284 is normally deenergized and lights up when a short circuit occurs in that portion of the circuit to which it is connected. In the upper center part of the diagram is shown a contact block for the various lines to make the necessary connections.

We will now describe the operation of the system as units to be tested are applied to the test block 4. The initial position of the ratchet or rotating switch A is as shown and the screw driving means S and P are placed in juxtaposition to the screws to be adjusted so that the trimmer condensers will be of proper capacities. The switch 206 is closed to apply the line voltage to start the motor 114 in operation and supply power to the various portions of the circuit. The input terminals 222 and 224 are at this time connected to a modulated radio frequency voltage of a certain predetermined frequency and having a value of approximately one volt. Thus the motor is in condition for driving the driving means which as yet have not turned the adjusting screws, and power is applied to all of the necessary parts of the circuit.

Switch 278 is manually depressed momentarily and it will be obvious from the circuit that when this occurs point 1 on the ratchet switch is connected to ground. This completes a circuit through relay 188 as follows: from the source of power indicated by the arrow, through relay 188, line 286, switch arm 160, switch contact 1, through switch 278 to ground. This causes relay 188 to raise its armature 190 and complete the circuit through switch 190 and 192. This switch closure completes a circuit for the stepping relay 168 of the ratchet switch which is then energized through the following circuit: incoming line 204, switch 206, switch 192—190, line 288, line 290, relay coil 168, line 292 to incoming line 202.

This ratchets the solenoid switch around until the three switch arms 160, 162 and 164 contact the next adjacent points, namely, stationary switch points 2, 8 and 14. At this point it is desired to point out that while in its initial condition switch arm 164 while resting on stationary contact 13 applied a ground to the common connection of resistors 260 and 258, and in moving to its new position removes such ground and causes a delayed automatic gain control voltage to be applied to the grid of tube $V_1$, which will be more fully described at a later point in the specification. As the switch arm 160 rests on point 2 of the switch, it connects relay 188 now to switch 178. At the same time the switch arm 162 in moving from point 7 to point 8 on the ratchet switch broke the 115 volt supply circuit through point 7 to the retracting solenoid 174 which was initially energized to keep the screw drivers S and P out of engagement with the screws to be adjusted. This initial energizing circuit may be traced as follows: incoming line 204, switch 206, line 294, switch arm 162, switch point 7, line 296, relay coil 174, line 298 to incoming line 202. Thus this retracting coil for the screw drivers has been energized, but when the switch arm 162 moves to the new point 8, this coil is deenergized and the screw drivers are allowed to contact the heads of the screws which it is desired to adjust.

Let us assume that screw driver S engages the adjustable screw of the trimmer condenser in the secondary circuit and this now is in a position to be able to turn that screw as desired. However, even though the shaft 104 is rotating, no driving connection has been made through either of the bevel gears 142 or 144 to the driving gear 100. The circuit through switch arm 162 which now contacts point 8 is now completed to one of the solenoid actuating coils for the driving means and in this instance is relay coil 138 which is energized through the following circuit: line 204, switch 206, line 294, switch arm 162, switch point 8, line 300, line 302, relay coil 138, line 304, line 306 to incoming line 202. This causes the coil 138 to be energized, pulling the armature thereof upward as shown in Figure 5, and therefore causing engagement of the gear 144 with the gear 100 and causing the screw driver S to be driven.

As previously mentioned, it is desired to run the adjusting screw to one limit of its travel before starting the adjustment so that it is assured that the voltage flow through the control circuit for adjusting the circuit formed of the inductance and capacity in the intermediate frequency transformer will continue to flow in one direction until a peak has been reached. Thus the screw driver S will cause the screw to be driven to one limit position, and as the resisting torque applied by the screw becomes large, the clutch mechanism before referred to will allow slippage between the driving sleeve 84 and the clutch collar 92 to allow the screw driver to stop but still permit the gears to rotate.

When this occurs the clutch collar is forced axially of its shaft which movement closes in this instance a switch identified as 178. This completes the circuit to the solenoid 188 as follows: from ground through switch 178, through line 308, line 310, switch point 2, arm 160, line 286, relay 188 to the power indicating arrow. This causes relay 188 to again be energized, and, as before, such energization will complete a circuit to relay 168, which is the stepping relay for the ratchet switch A, and cause the various switch arms to be moved to their next adjacent switch point which is in this instance 3, 9 and 15.

Contact arm 164 which has now moved to point 15 connects relay 238 to ground and therefore energizes the same. This energizing circuit is from the source of power to the arrow on relay 238, then through 312, switch point 15, arm 164 to ground. This causes the armature members to be attracted toward the coil as shown in Figure 5, the results being to disconnect resistor 232 from resistor 314 and connect the same to resistor 316, and it also connects approximately 200 volts D. C. to inductance 318 through switch 198 operated by relay 194 through the following circuit: inductance 318, line 320, switch 246—248, line 322, switch 198, line 324, relay 180, line 326, resistor 328, line 330 to the plate 332 of the tube $V_5$. This furnishes the Thyratron with a continuous plate current and is in series with the relay 180 which will be energized at such times as the Thyratron $V_5$ draws current.

The connection of capacitor 26 to resistor 316 by the operation of switch 240—244 connects the grid circuit of the Thyratron $V_5$ to a differentiating circuit comprising resistor 316, capacity 262 and resistor 264, which provides the necessary transient voltage to the grid circuit of the triode when the I. F. trimmer has been peaked.

In moving the contact arm 162 from point 8 to point 9 on the stepping relay switch, the 115 volt circuit is disconnected from solenoid 138 and connected to solenoid 140 through the following circuit: line 204, switch 206, line 294, switch arm 162, switch point 9, line 334, line 336, relay coil 140, line 304, line 306 to incoming line 202. This causes the armature to be drawn downwardly as shown in Figure 5 and makes a driving connection between the gear 142 and the gear 100 which causes the screw driver S to be driven in the opposite direction to that formerly applied. This then causes the screw to be backed off from one of its limit positions, decreasing the capacity of the condenser $C_s$.

As this condenser is brought nearer or adjusted more nearly to a condition of resonance in the secondary circuit of the transformer, the energy transferred therethrough will become greater and this voltage appears across the output terminals G and minus. This voltage which is due to an audible modulation of the radio frequency being applied across the terminals 222 and 224 is demodulated by one section of the 6F8G double triode tube $V_2$ and further amplified by the 6V6GT tube $V_3$. It is then fed into the transformer 338 which is connected to a second transformer 228 and mounted between the two is a small meter 230. The two transformers may be replaced by a single one if the meter is not used at this point in the circuit.

The output of the signal appearing across these terminals is fed into the half wave rectifier $V_4$ and the rectified voltage is converted into a nearly D. C. wave by the filter system comprising condenser 236, and resistors 314, 232 and 234, and having conductive polarity toward resistor 232. A portion of this negative voltage which appears across resistor 234 is applied across resistor 252 and capacity 254. As an illustration in this case, resistor 252 is about two megohms and condenser 254 approximately .5 microfarad. The voltage thereacross will therefore take an appreciable amount of time to increase or decrease after the voltage has changed across resistor 234. This negative automatic gain control voltage which appears across condenser 254 is applied through resistors 258 and 260 to the grid of the tube $V_1$ and decreases the gain of $V_1$ in accordance with a slightly previous voltage across resistor 234. The resistor 260 is made variable so that it may be adjusted to give a convenient reading on the meter 230 with a standard coil in position and peaked. All other readings will be less than that. In the step relay position during which the switch arms occupy the positions 2, 8 and 14, it will be remembered that the trimmer condenser $C_s$ also is being changed by the screw driver S. This causes the voltage across the terminals G and minus to change and subsequently the voltage across resistor 234 and eventually the automatic gain control voltage applied through the circuit just described to the tube $V_1$. When the contactors arrive at switch points 3, 9 and 15 by the last ratchet step described and while the transition is made from points 2, 8 and 14 to 3, 9 and 15, the automatic gain control voltage has had sufficient time to substantially catch up with the voltage across resistor 234. It is desired to point out that the automatic gain control is operative at all points except the first switch point where it is grounded through point 1 to maintain the input of the transformer fairly constant.

Now when the switch arms are on the positions 3, 9 and 15, the regulating circuit composed of resistor 232, 234 and capacitor 236 is connected across resistor 316 instead of resistor 314. A differentiating circuit or filter now consists of capacitor 262, resistor 264 and a comparatively small variable resistor 266. A change in the D. C. voltage across resistor 316 will cause a current through this resistor or filter combination to charge capacitor 262 to a new value. The direction of this current depends on whether the voltage across resistance 316 increases or decreases, and the magnitude of the current depends on the time rate and amount of change of that voltage across resistor 316.

The polarity is such that a decreasing voltage gives rise to a decreasing negative voltage across resistor 316 and a transient current through resistor 264 such that the Thyratron $V_5$ grid becomes more positive with relation to the ground causing tube $V_5$ to ionize when the addition of this positive voltage to the negative bias makes its grid sufficiently positive. It is also necessary to mention that the relation between screw driver speed, rate of change of capacity $C_s$ to the time of action of the automatic gain control circuit is sufficient so that the automatic gain control circuit does not catch up while the screw driver is running out the screw on $C_s$ to reach one of the extremes. However, in adjusting back to the peak adjustment and when the peak is closely approached, the automatic gain control circuit can catch up because the voltage change in the region of the peak of the frequency is not as rapid as that voltage change in approaching the peak. It should also be pointed out that as the rectified voltage approaching D. C. which is supplied to the capacity 236 becomes larger, more current is drawn by the resistors 232, 234 and 316 and the filtering action thereof is not as good as previously. The grid of tube $V_5$ will have impressed upon it a more or less pulsating voltage. As long however as $C_s$ is being adjusted toward peak, there will be a considerable direct current component of transient current through resistor 264 in such a direction as to add to the negative bias on the grid to prevent $V_5$ from ionizing.

When, however, the rate of change of voltage through the amplifier circuits becomes less as $C_5$ is reaching a value to correspond to the top of the resonance peak, less additional bias is applied to the grid by the transient current through resistor 264 and a great proportion of this pulsating component will pass through condenser 262 which will also tend to cause tube ionization. It will thus be apparent that a rather complicated relation is obtained from screw driver speed, mechanical and electrical relay delay, and limits of rate of change of voltage which is caused by variation in $C_s$ and $C_p$ with manufacturing tolerances in variation with the inductance associated with the two condensers in the I. F. transformer, the amount of filtering of the rectified audio voltage and the automatic gain control constant in the feedback circuit.

Thus with the screw driver S backing off the adjusting screw and approaching the peak of the resonant circuit, we reach a point at which the rate of change of voltage ceases and at that point the tube $V_5$ is allowed to fire or ionize which action causes a flow in the plate circuit thereof which has been previously traced and includes the relay 180. The energization of this relay closes a pair of switches 184 and 186 which complete the 115 volt A. C. circuit to relay 168 and relay 174, the first through the following circuit: incoming line 204, switch 206, switch 186, line 288, relay coil 168, line 292 back to incoming line 202. This circuit energizes the stepping relay 168. The circuit for relay 174 is as follows: incoming line 204, switch 206, line 294, line 340, switch 184, line 296, relay coil 174, line 298, to incoming line 202.

The energization of relay 168 of course causes the relay to be stepped along one further step to change the switch arms 160, 162 and 164 to stationary switch points 4, 10 and 16 respectively. Also, the energization of relay 174 causes the screw drivers to be immediately retracted from engagement with either of the adjusting screws to give an accurate peak setting. When switch arm 162 moved from switch point 9 to 10, it broke the circuit to the relay coil 140, but completed a circuit to relay coil 154 to operate the second screw driver P, which, as previously described, is substantially the same operation as traced through with regard to the condenser known as $C_s$, and this screw driver tends to run down the adjusting screw in capacitor $C_p$ until it is entirely at one end of its travel as in the former case. This again causes the overload clutch mechanism to slip and switch 176 to close, which again causes the energization of relay 188 to energize the stepping relay 168 and advance the various switch points one more notch, namely, to 5, 11 and 17.

At this time the system is ready to adjust the screw in capacitor $C_p$ back to its peak value as in the prior instance and this will cause the screw to be backed off until such time as the tube $V_5$ is allowed to ionize and cause energization of the relay 180 which immediately withdraws the screw drivers from contact with the adjusting screws and also causes the step relay to actuate once more. This carries the switch contact 162 to position 12 and in this position causes the circuit to energize relay 170 which is the lock-in relay for the ratchet switch and upon this energization the whole ratchet switch mechanism is allowed to return to the position initially described where it is ready for another operation of the mechanism.

The operation of the system may be summarized as follows with respect to the various switch positions of the automatic stepping relay A:

*First position*

(a) Screw drivers S and P retracted by coil 174.
(b) Automatic gain control circuit grounded through switch point 13.
(c) All of the relays deenergized.

*Second position*

(a) Screw drivers S and P contact adjusting screws (relay 174 deenergized).
(b) Automatic gain control circuit energized.
(c) Driving relay 138 energized to drive adjusting screw to one extremity.
(d) Clutch switch 178 operated to stop drive at limit of screw driver.

*Third position*

(a) Screw drivers still contact the screws.
(b) Automatic gain control circuit still energized.
(c) Driving relay 140 now energized to reverse screw drive by screw driver S toward peak point.
(d) Relay 180 energized at peak by ionization of tube $V_5$.
(e) Screw drivers withdrawn at once by energization of relay 174.

*Fourth position*

(a) Screw drivers again contact screws.
(b) Automatic gain control circuit energized.
(c) Driving relay 154 for screw driver P energized to bring the screw to one extremity.
(d) Clutch switch 176 operated at extremity to limit drive.

*Fifth position*

(a) Screw drivers still contact screws.
(b) Automatic gain control circuit energized.
(c) Driving relay 156 now energized to back off screw by driver P toward peak point.
(d) Relay 180 energized at peak by ionization of tube $V_5$.
(e) Withdrawal of screw drivers at peak point.

*Sixth position*

(a) Energization of unlocking relay to return whole system to its initial condition.

It will thus be evident that the full cycle of the apparatus provides for the adjusting of two screws to vary capacity to resonant circuit position, separately and independently, and an automatic return to the initial position when that has been accomplished. Immediately upon reaching the resonant condition of either circuit the adjusting means is withdrawn so that the setting is very accurate. All that it is necessary for an operator to do is to apply these transformer units to the testing block and put them in juxtaposition to the adjusting screw drivers, close the two main switches and the machine then takes care of the rest. As previously mentioned, this is only one of a number of instances wherein means for measuring the peak of resonant value of a circuit can be used and the applicant's invention should not be limited to the disclosure of the specific means shown here to illustrate its utility.

I claim:

1. In an adjusting system for a coupling unit formed of capacity and inductance and having screwable means for adjusting the capacity to tune the unit to a predetermined resonant frequency, a driven screw driver normally held out of engagement with the screwable means, a step-by-step relay switch, means for driving the screw driver in either direction, magnetic means for controlling said screw driver drive connected to said relay switch, and a switch controlled by longitudinal movement of the driving means whereby the movement of the relay switch to different positions causes energization of the screw driver first to engage the screwable means and then rotate the same to a limit in one direction and then to a predetermined position in the opposite direction.

2. In an adjusting system for a coupling unit formed of capacity and inductance and having screw means for adjusting the value of the capacity to tune the unit to a predetermined frequency, screw driving means, a source of power therefor capable of driving the screw driving means in either direction, magnetic means to control the direction of rotation of the screw driving means, a slip friction clutch in the driving means whereby when the torque exceeds a certain amount it will slip and cause longitudinal movement of one of the parts of the clutch, switch means operable by such movement, a step-by-step ratchet switch controlling the magnetic means for the driving means and actuating means for said step-by-step switch controlled by the clutch switch whereby the screw driving means will be driven in one direction, stop, and rotate in a reverse direction automatically.

3. In an adjusting system for a coupling unit formed of capacity and inductance and having screw means for adjusting the value of the capacity to tune the unit to a predetermined frequency, screw driving means, a source of power therefor capable of driving the screw driving means in either direction, magnetic means to control the direction of rotation of the screw driving means, a slip friction clutch in the driving means whereby when the torque exceeds a certain amount it will slip and cause longitudinal movement of one of the parts of the clutch, switch means operable by such movement, a step-by-step ratchet switch controlling the magnetic means for the driving means, actuating means for said step-by-step switch controlled by the clutch switch whereby the screw driving means will be driven in one direction, stop, and rotate in a reverse direction automatically, and thermionic means connected to the output of the unit controlling the driving means to cause the same to stop further adjustment upon a peak of energy passing through the unit.

4. In an adjusting system for a tunable circuit formed of inductance and capacity, one of which is adjustable to tune said circuit to a predetermined resonant frequency, a source of power of the desired frequency connected to the input of the tunable circuit, amplifying means connected to the output of the tunable circuit, control means for adjusting the adjustable element in the tuned circuit and means connectiing the amplifier output to the control means and also feed back to the input of the tunable means for volume regulation.

5. In an adjusting system for a tunable circuit formed of inductance and capacity, one of which is adjustable to tune said circuit to a predetermined resonant frequency, a source of power of the desired frequency connected to the input of the tunable circuit, amplifying means connected to the output of the tunable circuit, control means for adjusting the adjustable element in the tuned circuit, means connecting the amplifier output to the control means and also feed back to the input of the tunable means for volume regulation, and delay means in the feed back means to prevent too rapid correction for volume regulation.

6. In an adjusting system for a tunable circuit formed of inductance and capacity, one of which is adjustable to tune said circuit to a predetermined resonant frequency, driving means for adjusting said adjustable portion in either direction, switching means to control said driving means automatically to first drive said adjustment in one direction and then the other, means controlled by the output of the tunable system to deenergize the driving means and a second switching means between the output of the tunable means and the controlled means to apply said output to the controlled means only when the tunable means is being adjusted in the second direction.

7. In an adjusting system for a tunable circuit formed of inductance and capacity, one of which is adjustable to tune said circuit to a predetermined resonant frequency, reversible driving means for driving the adjustable means in either direction, step-by-step switching means to control said driving means to automatically drive said adjustable means first in one direction and then in the reverse direction, control means to deenergize the driving means at the desired point, an electronic tube controlling the energization of the control means and a second switching means controlled by the step-by-step switching means connected to the electronic means whereby the latter is in circuit only on the reverse driving of the driving means.

8. In an adjusting system, a thermionic tube in which current flows through an ionized path between an anode and a cathode, operating apparatus connected to said anode, a control electrode in said tube to control the flow between the cathode and anode, a source of fluctuating voltage, means interconnecting said source and said control electrode whose output voltage at the control electrode varies in proportion to the rate of change of voltage at the source so that the biasing voltage at the control electrode is a function of the speed of variation of source voltage to control the conductive periods of the tube and the apparatus controlled thereby in proportion to the rate of voltage change.

9. In an adjusting system, a thermionic tube in which current flows through an ionized path between an anode and cathode, operating apparatus connected to said anode, a control electrode in said tube to control the flow between cathode and anode, a circuit containing capacity and resistance in series connected between the control electrode and the cathode, a source of varying voltage and conductive means connecting said source to the circuit at a point between the resistance and capacity so that as the rate at which the voltage changes varies, the current through the resistance will change and charge the capacity to a different value to alter the biasing potential on the control electrode and thus control the conductive periods of the tube and the operation of the apparatus.

10. In an adjusting system, a thermionic tube in which current flows through an ionized path between an anode and cathode, operating apparatus connected to said anode, a control electrode in said tube to control the flow between cathode and anode, a circuit containing capacity and resistance in series connected between the control electrode and the cathode, a source of varying voltage and conductive means connecting said source to the circuit at a point between the resistance and capacity, an adjustable negative biasing circuit also connected to the control electrode both circuits controlling the bias potential and the conductive periods of the tube in proportion to the rate of voltage change at said source.

11. In an adjusting system for a tunable circuit having inductance and capacity, the value of at least one of which may be varied for tuning purposes, driving means to change the value of the variable means, a power input to the tunable circuit, an amplifying output circuit connected to the tunable circuit, means for controlling the operation of the driving means including a normally non-conductive thermionic tube having an anode and cathode, a control element in said tube to determine the conductive periods thereof and filter means interconnecting the amplifier output and said control element whose output voltage is proportional to the rate of change of input voltage so that the rate of change of voltage in the tunable circuit controls the driving means for stopping the same as the tuned circuit reaches peak resonance.

12. In an adjusting system for a tunable circuit having inductance and capacity, the value of at least one of which may be varied for tuning purposes, driving means to change the value of the variable means, a power input to the tunable circuit, an amplifying output circuit connected to the tunable circuit, means for controlling the operation of the driving means including a normally non-conductive thermionic tube having an anode and cathode, a control element in said tube to determine the conductive periods thereof, a resistance and capacity connected in series between the cathode and control element and conductive means interconnecting a point between the resistance and capacity to the amplifier output and an adjustable biasing means connected to the control element so that as the rate of change of voltage in the amplifier output changes, the current through the resistance will change to vary the charge on the condenser and the bias on the element and the driving means will be controlled by the rate of voltage change.

13. In an adjusting system for a tunable circuit formed of capacity and inductance, the capacity being adjustable, means for continuously varying the value of the capacity, an input circuit connected to the tunable circuit having a predetermined frequency, a normally non-conductive thermionic tube having a grid, cathode and plate, filter means interconnecting said grid, cathode and tunable circuit whose output voltage as applied to the grid is proportional to the rate of change of voltage in the tunable circuit and control means for the continuously varying means connected to the plate of the tube so that as the varying means adjusts the tunable circuit to resonance the rate of voltage variation in the output of the tuned circuit will vary, the tube will conduct through control grid variation and the control means will be deenergized.

MARTIN W. GAISER.